US006557015B1

United States Patent
Bates et al.

(10) Patent No.: US 6,557,015 B1
(45) Date of Patent: Apr. 29, 2003

(54) DETERMINING WHETHER A SECOND HYPERTEXT DOCUMENT IS INCLUDED IN A LIST OF ACTIVE DOCUMENT TRAILS

(75) Inventors: Cary Lee Bates, Rochester, MN (US); Paul Reuben Day, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/156,843

(22) Filed: Sep. 18, 1998

(51) Int. Cl.$^7$ ............................................. G06F 17/30
(52) U.S. Cl. ..................... 707/501; 715/501.1; 715/513
(58) Field of Search ................................ 707/501, 513; 345/760

(56) References Cited

U.S. PATENT DOCUMENTS

| | | | | |
|---|---|---|---|---|
| 5,717,860 A | * | 2/1998 | Graber et al. ............... | 709/227 |
| 5,860,071 A | * | 1/1999 | Ball et al. .................... | 707/100 |
| 5,890,172 A | * | 3/1999 | Borman et al. .............. | 707/501 |
| 5,894,554 A | * | 4/1999 | Lowery et al. .............. | 709/203 |
| 5,963,964 A | * | 10/1999 | Nielsen ....................... | 707/501 |
| 6,009,429 A | * | 12/1999 | Greer et al. ................... | 707/10 |
| 6,018,342 A | * | 1/2000 | Bristor ........................ | 345/354 |
| 6,094,684 A | * | 7/2000 | Pallman ....................... | 709/227 |
| 6,128,635 A | * | 10/2000 | Ikeno ...................... | 707/501.1 |
| 6,128,667 A | * | 10/2000 | Jeffrey ........................ | 709/203 |
| 6,154,752 A | * | 11/2000 | Ryan ........................... | 345/817 |
| 6,182,072 B1 | * | 1/2001 | Leak et al. .................... | 707/10 |
| 6,182,116 B1 | * | 1/2001 | Namma et al. ......... | 707/103 R |
| 6,182,133 B1 | * | 1/2001 | Horvitz ....................... | 709/223 |
| 6,208,995 B1 | * | 3/2001 | Himmel et al. ............. | 707/104 |
| 6,226,655 B1 | * | 5/2001 | Borman et al. ............. | 707/501 |
| 6,236,661 B1 | * | 5/2001 | Ballard ........................ | 370/410 |
| 6,249,804 B1 | * | 6/2001 | Lam ............................ | 709/203 |
| 6,286,029 B1 | * | 9/2001 | Delph .......................... | 709/203 |
| 6,338,075 B2 | * | 1/2002 | Fukuda ........................ | 345/760 |
| 6,405,238 B1 | * | 6/2002 | Votipka ....................... | 345/760 |

OTHER PUBLICATIONS

Letizia: An Agent that Assists Web Browsing Autonomous Interface Agents, Lieberman, Media Lab., MIT, 3/97.*
Ariadne: a Java–Based Guided Tour System for the World Wide Web, Juhne et al, Computer Networks and ISDN Systems, 1998.*
Browsing the WWW by Interacting with a Textual Virtual Environment—a Framework for Experimenting with Navigational Software, Proc. of ACM Hypertext '96, 1996, p. 170–179.*
Supporting Hierarchical Guided Tours in the World Wide Web, Hauck, Computer Networks and ISDN Systems, 1996, p. 1233–1242.*
Adding Multimedia Collections to the Dexter Model, Garzotto, et al, ACM ECHT '94 Proceedings, 9/94, p. 70–80.*
Hypertext and the Author/Reader Dialogue, Michalak et al, ACM Hypertext '93 Proceedings, 11/93, p. 174–182.*

* cited by examiner

*Primary Examiner*—Stephen S. Hong
*Assistant Examiner*—Cesar B Paula
(74) *Attorney, Agent, or Firm*—Wood, Herron & Evans (57) ABSTRACT

An apparatus, program product, and method utilize a "document trail" to facilitate the location of other documents reachable from a given hypertext document. The document trail includes a plurality of identifiers that respectively identify a plurality of interlinked hypertext documents and permit a user to navigate from a origination hypertext document to a destination hypertext document simply by following the trail of interlinked hypertext documents to the destination hypertext document.

25 Claims, 7 Drawing Sheets

DETERMINING WHETHER A SECOND HYPERTEXT DOCUMENT IS INCLUDED IN A LIST OF ACTIVE DOCUMENT TRAILS

FIELD OF THE INVENTION

The invention is generally related to computers and computer software. More specifically, the invention is generally related to the display of and navigation between hypertext documents with browser computer programs and the like.

BACKGROUND OF THE INVENTION

The amount and variety of information that can be accessed through a computer continues to increase at an astounding rate. The Internet, in particular, has enabled computer users to access a wide variety of information from other computers located all over the world.

Much of the information accessible via the Internet is organized into hypertext documents, which are typically documents formatted in a language known as Hypertext Markup Language (HTML), and which are accessed via a segment of the Internet known as the World Wide Web. Hypertext documents typically include one or more embedded "hypertext links" that an end user can select to either jump to different documents, or to jump to different locations within the same document. Each hypertext document typically is identified by the storage location (known as a Uniform Resource Locator (URL)) at which the document is stored, with a hypertext link to a particular document specifying the storage location of that document so that, upon selection of the link, that document may be retrieved.

A wide variety of other information such as text, graphics, video, sound, and animation may be integrated into hypertext documents, and moreover, these documents can be organized into "sites", typically maintained by a single entity, that collect multiple related documents together in a coherent fashion. Furthermore, due to the immense popularity of the World Wide Web, many private computer networks now also support hypertext documents, as do a number of existing computer operating systems and computer software applications.

A computer program, often referred to as a browser, is typically used to navigate between and through hypertext documents. With a browser, an end user can use a mouse or other pointing device to point and click on links such as highlighted text, images or other user interface components (e.g., buttons) in documents to navigate to different documents and/or to different locations within the same document.

While the point and click interface used to navigate between hypertext documents is exceptionally simple to learn and use, the wealth of available information makes it relatively easy for a user to forget the specific locations of useful documents, as well as the particular paths or trails (i.e., the sequences of locations) that the user took to find those useful documents.

As an attempt to address these difficulties, many browsers support the use of aliases (also referred to as "bookmarks" or "favorites"), through which a user can maintain a list of favorite sites or documents that a user expects to revisit in the future. Retrieving a bookmarked document at a later date then only requires the user to locate the bookmark corresponding to a desired document in the list, and then select that bookmark to initiate retrieval of the document.

An important limitation of bookmark lists, however, is that the larger the lists become, the more difficult it is to locate specific bookmarks in the lists. Thus, a user often must exercise some degree of self-control to only add bookmarks for the more important documents so as to keep the size of the list at a manageable level.

One situation where a user might refrain from adding a bookmark to a list is when the user has already bookmarked another document in the same site. Often, a user will bookmark the "home page" for a particular site, rather than specific documents of interest in the same site, assuming that he or she can navigate from the home page to the particular documents of interest in a few steps. However, when a user later wishes to find a particular document in a site, the user may have forgotten how to find that document from the home page for the site. The user may as a result waste time searching through a site for the particular document.

As an example, a user might frequently purchase groceries over the Internet from a particular food supplier. The food supplier has an Internet site with a home page, then with particular groceries classified and accessible through different documents that are linked to the home page. Salsas, for example, might be accessible from the home page by selecting an "ethnic foods" document, then a "Mexican" document, and finally a "salsas" document. Tortilla chips, on the other hand, might be accessible from the home page by selecting a "snacks" document, then a "chips" document, and finally a "tortilla chips" document.

If the user were to bookmark the page for every type of item he or she purchased from the supplier, the bookmark list could become very large and unwieldy. However, should the user merely bookmark the home page, the user may later forget where particular items are located, e.g., whether salsas or tortilla chips are classified as "ethnic foods" or "snacks" in the site. Consequently, the user would then be required to hunt around the site to find the particular items, thereby wasting time and decreasing productivity.

Thus, with conventional browsers, a significant conflict exists between the goal of storing as many bookmarks as possible in a bookmark list to maximize the ability to revisit documents, and the goal of maintaining the list as compact as possible to facilitate the lookup of individual bookmarks in the list. A significant need therefore exists for a manner of increasing the ability to locate documents without needlessly cluttering up a bookmark list or the like.

SUMMARY OF THE INVENTION

The invention addresses these and other problems associated with the prior art by providing an apparatus, program product, and method that utilize a document trail to facilitate the location of other documents reachable from a given hypertext document. A document trail consistent with the invention includes a plurality of identifiers that respectively identify a plurality of interlinked hypertext documents and permit a user to navigate from an origination hypertext document to a destination hypertext document simply by following the "trail" of interlinked hypertext documents to the destination hypertext document.

A document trail may be created in a number of manners consistent with the invention. For example, a document trail from an origination hypertext document to a destination hypertext document may be created in response to receiving user input to create the document trail by navigating from the origination hypertext document to the destination hypertext document in response to user input; and, after receiving user input to create the document trail, storing in the document trail an identifier for the destination hypertext document and any intermediate hypertext document visited when navigating from the origination hypertext document to the destination hypertext document.

Navigation from the origination hypertext document to the destination hypertext document may occur after a user has indicated a desire to create the document trail, whereby storing the identifiers for the document trail may occur principally through a process of recording the steps taken to reach a desired destination, and automatically appending each new step to the trail. In the alternative, navigation from the origination hypertext document to the destination hypertext document may also occur prior to indicating a desire to create the document trail, whereby storing the identifiers for the document trail may occur through "backtracking" from the destination hypertext document to the origination hypertext document to retrace the steps taken to reach the desired destination.

Once created, a document trail may be identified to a user in a number of manners consistent with the invention. Among other manners that will become apparent below, a document trail may be displayed to a user by using a unique display representation for a hypertext link definition that defines a link between two documents in a document trail. Thus, when multiple hypertext links are present in a given hypertext document, a user can readily determine which link in the document should be selected in order to follow the desired document trail.

Therefore, consistent with another aspect of the invention, a display representation of at least a portion of a first hypertext document is displayed on a computer display, with the portion of the first hypertext document including a hypertext link definition that references a second hypertext document. In addition, it is determined whether the second hypertext document is one of a plurality of interlinked hypertext documents in a document trail, and based upon whether the second hypertext document is one of the plurality of interlinked hypertext documents in the document trail, one of first and second display representations of the hypertext link definition is displayed.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Hardware and Software Environment

Figure 1:
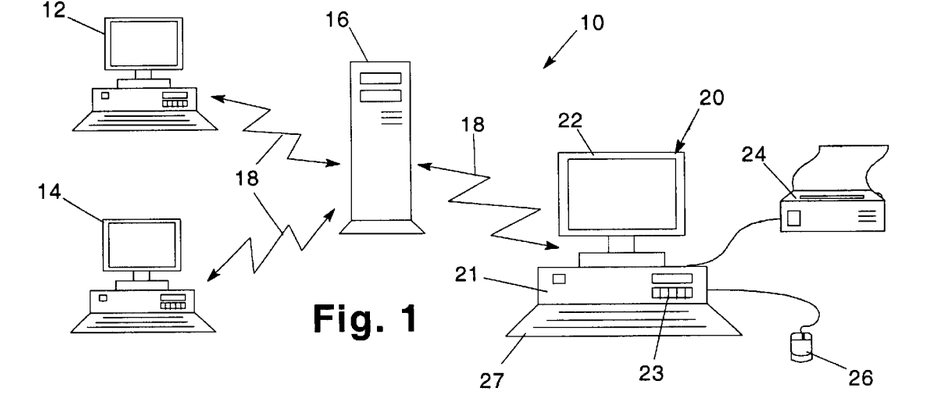
FIG. 1 is a block diagram of a networked computer system consistent with the invention.

Turning to the Drawings, wherein like numbers denote like parts throughout the several views, FIG. 1 illustrates a computer system 10 consistent with the invention. Computer system 10 is illustrated as a networked computer system including one or more client computers 12, 14 and 20 (e.g., desktop or PC-based computers, workstations, etc.) coupled to server 16 (e.g., a PC-based server, a minicomputer, a midrange computer, a mainframe computer, etc.) through a network 18. Network 18 may represent practically any type of networked interconnection, including but not limited to local-area, wide-area, wireless, and public networks (e.g., the Internet). Moreover, any number of computers and other devices may be networked through network 18, e.g., multiple servers.

Client computer 20, which may be similar to computers 12, 14, may include a central processing unit (CPU) 21; a number of peripheral components such as a computer display 22; a storage device 23; a printer 24; and various input devices (e.g., a mouse 26 and keyboard 27), among others. Server computer 16 may be similarly configured, albeit typically with greater processing performance and storage capacity, as is well known in the art.

Figure 2:
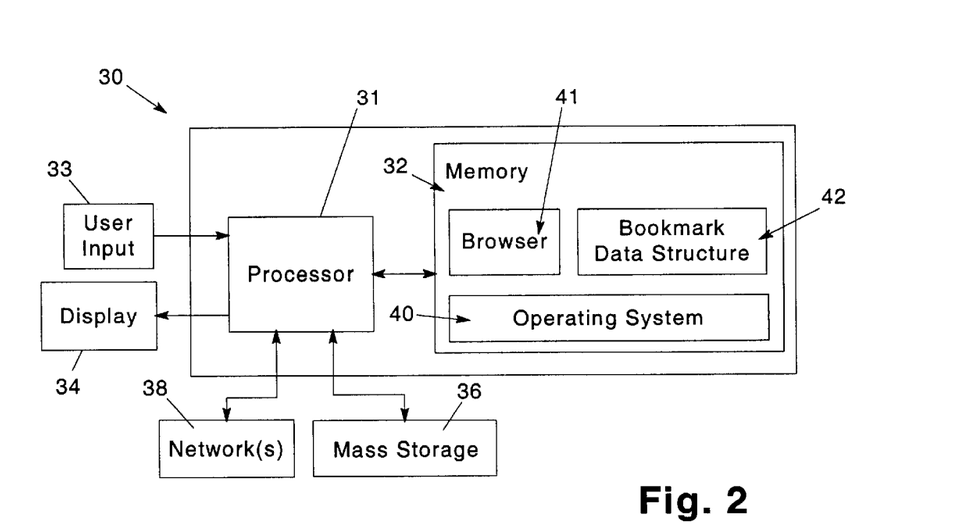
FIG. 2 is a block diagram of an exemplary hardware and software environment for a computer from the networked computer system of FIG. 1.

FIG. 2 illustrates in another way an exemplary hardware and software environment for an apparatus 30 consistent with the invention. For the purposes of the invention, apparatus 30 may represent practically any type of computer, computer system or other programmable electronic device, including a client computer (e.g., similar to computers 12, 14 and 20 of FIG. 1), a server computer (e.g., similar to server 16 of FIG. 1), a portable computer, an embedded controller, etc. Apparatus 30 may be coupled in a network as shown in FIG. 1, or may be a stand-alone device in the alternative. Apparatus 30 will hereinafter also be referred to as a "computer", although it should be appreciated the term "apparatus" may also include other suitable programmable electronic devices consistent with the invention.

Computer 30 typically includes at least one processor 31 coupled to a memory 32. Processor 31 may represent one or more processors (e.g., microprocessors), and memory 32 may represent the random access memory (RAM) devices comprising the main storage of computer 30, as well as any supplemental levels of memory, e.g., cache memories, non-volatile or backup memories (e.g., programmable or flash memories), read-only memories, etc. In addition, memory 32 may be considered to include memory storage physically located elsewhere in computer 30, e.g., any cache memory in a processor 31, as well as any storage capacity used as a virtual memory, e.g., as stored on a mass storage device 36 or on another computer coupled to computer 30 via network 38.

Computer 30 also typically receives a number of inputs and outputs for communicating information externally. For interface with a user or operator, computer 30 typically includes one or more user input devices 33 (e.g., a keyboard, a mouse, a trackball, a joystick, a touchpad, and/or a microphone, among others) and a display 34 (e.g., a CRT monitor, an LCD display panel, and/or a speaker, among others). It should be appreciated, however, that with some implementations of computer 30, e.g., some server implementations, direct user input and output may not be supported by the computer.

For additional storage, computer 30 may also include one or more mass storage devices 36, e.g., a floppy or other removable disk drive, a hard disk drive, a direct access storage device (DASD), an optical drive (e.g., a CD drive, a DVD drive, etc.), and/or a tape drive, among others. Furthermore, computer 30 may include an interface with one or more networks 38 (e.g., a LAN, a WAN, a wireless network, and/or the Internet, among others) to permit the communication of information with other computers coupled to the network. It should be appreciated that computer 30 typically includes suitable analog and/or digital interfaces between processor 31 and each of components 32, 33, 34, 36 and 38 as is well known in the art.

Computer 30 operates under the control of an operating system 40, and executes or otherwise relies upon various computer software applications, components, programs, objects, modules, data structures, etc. (e.g., browser 41 and bookmark data structure 42, among others). Moreover, various applications, components, programs, objects, modules, etc. may also execute on one or more processors in another computer coupled to computer 30 via a network 38, e.g., in a distributed or client-server computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions will be referred to herein as "computer programs", or simply "programs". The computer programs typically comprise one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, optical disks (e.g., CD-ROM's, DVD's, etc.), among others, and transmission type media such as digital and analog communication links.

In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Those skilled in the art will recognize that the exemplary environments illustrated in FIGS. 1 and 2 are not intended to limit the present invention. Indeed, those skilled in the art will recognize that other alternative hardware and/or software environments may be used without departing from the scope of the invention.

Navigation with Document Trails

The illustrated embodiments of the invention generally utilize a document trail to facilitate navigation between an origination hypertext document, representing the start or head of a trail, and a destination hypertext document, representing the end of a trail. Between the origination and destination hypertext documents may also be included one or more intermediate documents representing intermediate stops along the trail. Each hypertext document in the trail is interlinked with any document that immediately precedes or succeeds the document in the trail, e.g., via a hypertext link in one document that references its immediately succeeding document in the trail. It should be appreciated that other types of links may also be used to interlink hypertext documents with one another, e.g., bi-directional links, among others.

In the illustrated embodiments, hypertext documents are associated with a given trail by storing a collection of identifiers that identify those documents in a common data structure associated with a document trail. Various document identifiers may be utilized to uniquely identify specific stops or points along a document trail. For example, a storage location identifier may be stored for each hypertext document comprising a document trail. For example, for use with the Internet or an intranet, hypertext documents may be in a Hypertext Markup Language (HTML) format, with the storage location identifier for each hypertext document in a trail being identified by the Uniform Resource Locator (URL) of the document. It should be appreciated that in other applications, other document formats and/or storage location identifiers may be used in the alternative.

A hypertext link is typically defined in a hypertext document using a hypertext link definition found in the source hypertext document, e.g., using suitable HTML-compatible tags. The link is presented to a user via a display representation generated by a HTML-compatible rendering engine in a browser or other computer program. A display representation is considered to include practically any audio and/or visual representation of information to a user, e.g., any combination of text, text formatting and/or attributes, graphics, sound, animation, video, etc.

A rendering engine is also typically used to generate an overall display representation of the hypertext document within which the hypertext link definition is found. It should be appreciated that the generation and display of HTML-based display representations, as well as display representations in other formats, are well known in the art.

Data Structure

In the illustrated embodiments, the origination document for any given document trail is found at a bookmarked location for a given user—that is, a document trail is typically "anchored" at and associated with a specific bookmarked location. In the alternative, document trails may be handled and stored separate from bookmarks or the like; however, the discussion hereinafter will focus on the use of document trails integrated into the bookmark management system of a browser computer program.

As discussed above, a bookmark (also referred to as an alias, a favorite, a shortcut, etc.), is typically used in connection with browsing to identify specific hypertext documents that a user may wish to revisit from time to time. Bookmarks are typically maintained in a common data structure, and are typically presented to a user via a pull-down menu and/or a separate window. A user is then able to navigate to a bookmarked document merely by selecting the bookmark from the menu or window.

Figure 3:
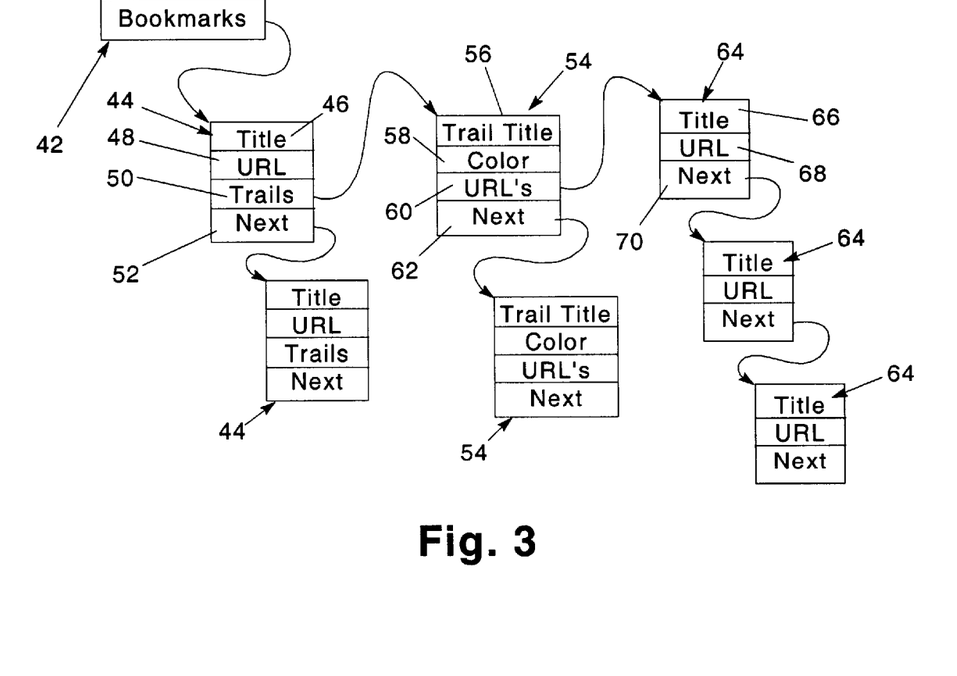
FIG. 3 is a block diagram of the bookmark data structure of FIG. 2.

One suitable bookmark data structure consistent with the invention is illustrated at 42 in FIG. 3. Data structure 42 is implemented as a linked list of bookmark records 44, with each bookmark record including a title field 46, a URL field 48, a trails field 50 and a next field 52. The title field 46 of each bookmark record 44 provides a user-supplied descriptive title of the bookmark. URL field 48 stores the URL associated with the bookmark. Trails field 50 provides a pointer to a linked list of trail records 54, and next field 52 provides a pointer to the next bookmark record 44 in data structure 42. It should be appreciated that the last bookmark record 44 in data structure 42 will have a NULL pointer stored in field 52.

It should also be appreciated that additional information may be stored in each bookmark record, e.g., a description field, etc., as is well known in the art. Furthermore, bookmark records may also be organized into a folder, directory or other tree-like data structure in the alternative. In general, the use and configuration of a bookmark data structure is known in the art, and any known modifications to a bookmark data structure may be utilized in the alternative.

Each bookmark record 44 may have associated therewith a linked list of document trail records 54, each of which is anchored at the URL associated with its associated bookmark record. Each document trail record 54 includes a plurality of fields 56, 58, 60 and 62. Field 56 provides a trail title, which is typically a user-supplied descriptor for the trail. Field 58 includes a color identifier that a user may supply to visually distinguish a trail from other active document trails. Field 60 is a pointer to a linked list of URL records 64, which specify the various documents comprising the document trail. Field 62 provides a pointer to the next trail in the linked list of document trails. It should be appreciated that the last document trail record 54 in the linked list of trails for a given bookmark will have a NULL pointer stored in field 62.

Each URL record 64 in the linked list associated with a particular document trail includes a plurality of fields 66, 68 and 70. Field 66 provides a descriptive title of the document representing a stop on a document trail. Field 68 provides the URL of that document. Field 70 provides a pointer to the next URL record 64 in the linked list. The last record in the list will have a NULL pointer in field 70.

It should be appreciated that various additional information may be stored in either of document trail records 54 or URL records 64. For example, as will become more apparent below, any other descriptive information for a particular document trail that serves to highlight the document trail may be included in addition to or in lieu of a title and color, e.g., a text description, an icon or image, a sound clip, an animated icon, etc. Moreover, it should be appreciated that not all the information provided in records 54 or 64 may be required. For example, it may not be necessary to include a title field 66 in each URL record 64. Furthermore, any of the titles or other descriptive information may be automatically generated without receiving user input. For example, the title of a document in a document trail could be retrieved from the title tag in the document. Moreover, the trail title might be automatically generated from the title tag from the destination document for the trail.

Moreover, for the illustrated embodiments, it should be noted that while each trail is anchored at a bookmark, the linked list of URL records 64 for the trail does not include a URL record corresponding to the location of the bookmarked origination document. Rather, the location of the immediately subsequent document in a document trail is stored in the first URL record for the trail. In other embodiments, however, it may be desirable to include the URL of the bookmarked document in the first URL record in the list.

Document Trail Creation

A document trail may be created in a number of manners consistent with the invention. One particularly useful manner of creating a document trail, which is referred to hereinafter as an auto-backtrack function, relies on a history list such as a "GO" list, which essentially is a history of documents previously viewed by a user. A GO list is used by a number of conventional browsers, and is typically implemented as a stack of document identifiers tracing back in time to previous documents visited by a user during a given browsing session. Various documents in a GO list typically may be selected directly via a pull-down menu. More frequently, however, the GO list is used to support the use of "BACK" and "FORWARD" functions in the browser, whereby a user may navigate step-by-step between documents stored in the GO list, as is well known in the art.

Figure 4:
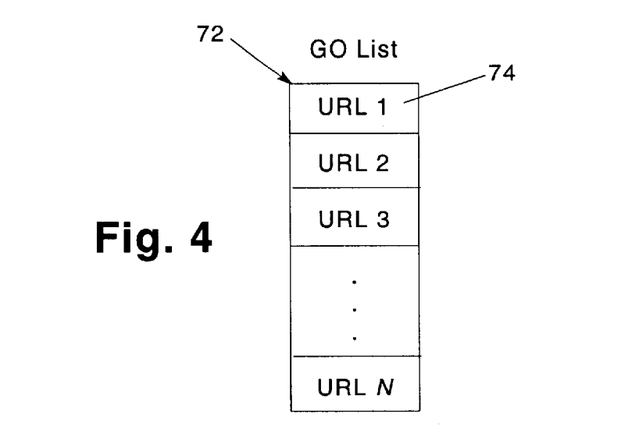
FIG. 4 is a block diagram of a go list data structure for use by the browser of FIG. 2.

FIG. 4, for example, illustrates a representative GO list 72 implemented as a stack including a plurality of records 74 that identify various URL's (denoted as URL 1 . . . N) that a user has previously visited. A GO list is typically maintained by pushing onto the top of the stack the URL for any new document visited. Then, whenever a user depresses a "BACK" button control for the browser to return to a previously-viewed document, either the current document is popped from the top of the stack, making the previous document the current document, or a pointer for the stack is updated to point to the previous document.

A GO list may be utilized during the creation of a document trail to locate a previously-viewed document that is present in the bookmark list. When such a document is located, that document, and the bookmark therefor, become the anchor for a new document trail. The various stops along the document trail are created by storing each of the documents in the GO list between the bookmarked document and the current document being viewed, resulting in a document trail that is anchored at a bookmarked document and which terminates at the currently-viewed document.

Typically, the GO list is searched solely for an occurrence of the "active" bookmark—that is, the last bookmark that was selected from the bookmark list by the user. In the alternative, however, the GO list may be searched for any bookmarked location, so that the trail is associated with the bookmarked location that was most recently viewed by the user.

As will become more apparent below, other manners of creating a new document trail may be utilized in the alternative. For example, it may be desirable to support an auto-append function to create an empty document trail at a current document, and then record a user's navigation subsequent to creation of a document trail to, in effect, append new documents onto a document trail until the user indicates that the end of the document trail has been reached. Moreover, other manual editing functions may be utilized to manually create or alter a document trail consistent with the invention.

Document Trail Display and Use

Once created, a document trail may be identified to a user in a number of manners. For example, whenever a currently-displayed document in a browser is a member of a document trail, it may be desirable to lead the user to the next location in the document trail by uniquely highlighting any display representation for a hypertext link definition that references the next location in the document trail. For example, for a text-based display representation, it may be desirable to display the text for the hypertext link in a unique color associated with that given document trail. Also, in addition to or in lieu of a unique color, an icon may be displayed adjacent to the display representation. Moreover, a display representation may be highlighted continuously or only when a pointer is disposed over the representation, and furthermore, a pop-up window or the like may be displayed to highlight the representation and/or present additional information about the trail. Sound, animation, video, etc. may also be used, so long as the display representation distinguishes the link from other links that are not associated with the same document trail.

A document trail may also be displayed and accessed using a dedicated user interface control referred to herein as a trail control panel. For example, it may be desirable to provide a trail control panel having "next" and/or "previous" (or "back" and "forward") controls such as buttons to permit a user to navigate to the next or previous documents in a document trail from any given point on the document trail. The buttons may be tied to different document trails using common display characteristics, e.g., a common color or title, among others. Moreover, direct access to specific locations along a document trail may be supported, e.g., through a pull-down or pop-up menu, or via a separate dialog box or window. A multitude of other user interface mechanisms may also be used in the alternative.

In one implementation discussed in greater detail below, for example, a trail control panel is displayed having a button for each active document trail, with the button for each trail displayed with a color that matches that of the document trail. User selection of a button results in navigation to the next document in the associated trail. Moreover, by placing the pointer over a button, additional information about the associated trail is displayed in a pop-up window.

It also may be desirable to display the association between a document trail and a bookmark within the pull-down menu and/or separate dialog box or window within which is displayed one or more bookmarks from a user's bookmark list. For example, as described in greater detail below, it may be desirable to display adjacent any bookmark title a sequence of colored controls that indicate the colors of the different document trails that are anchored at the bookmarked location. Placing a pointer over a control may result in additional information about the trail being displayed in a pop-up window, e.g., the trail title, the trail destination, and/or a list of documents in the trail. In addition, clicking on a control may result in navigation to the bookmarked document and scrolling the document to the position of a hypertext link associated with the document trail. Clicking on a control or supplying other input to a control (e.g., via a pop-up menu) may also result in navigation to the last document, or ultimate destination, in the associated trail, if desired.

Other user input mechanisms and arrangements for use in displaying and/or manipulating document trails will become more apparent from the discussion hereinafter.

Browser Configuration and Operation

Figure 5:
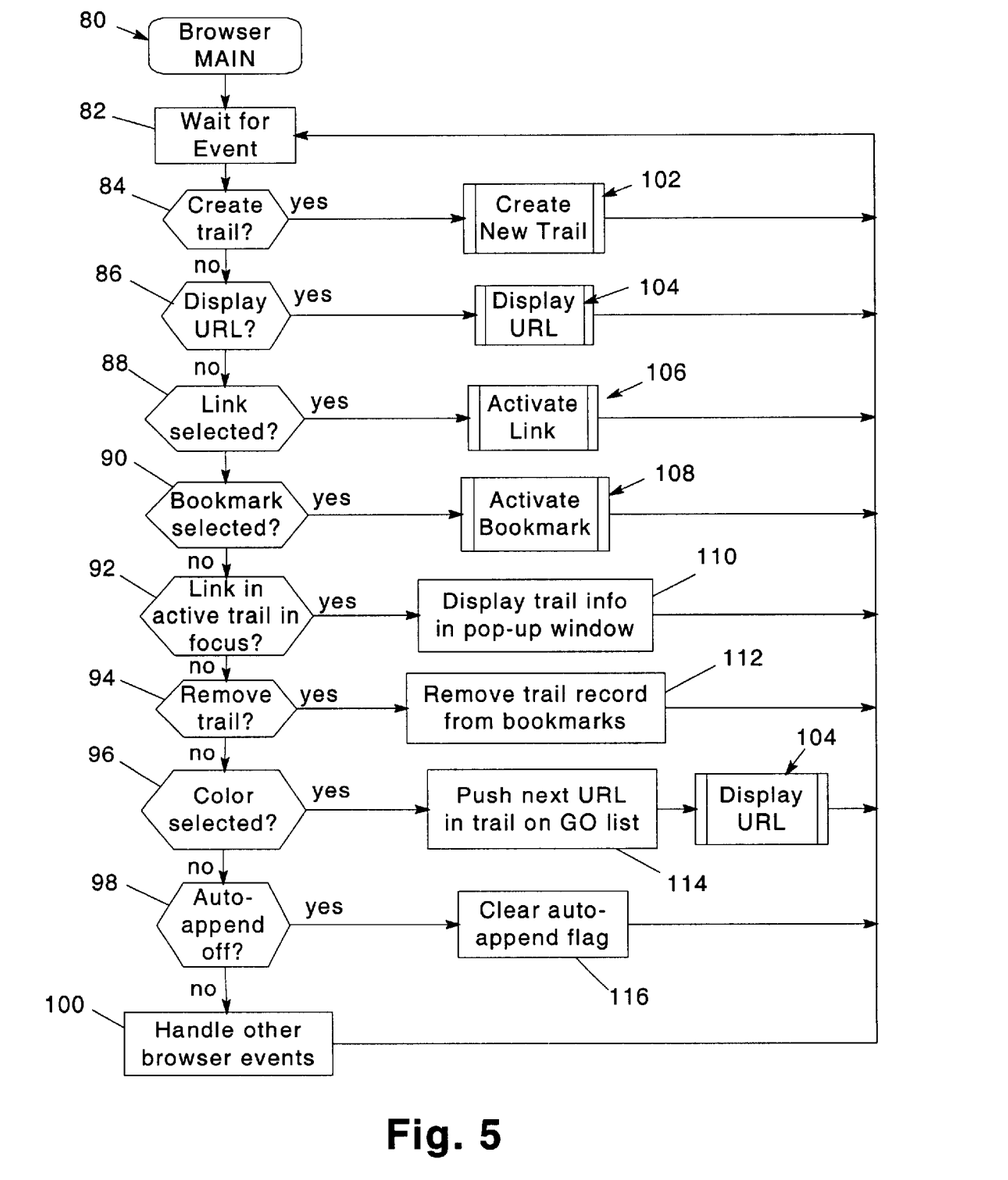
FIG. 5 is a flowchart illustrating the program flow of a main routine for the browser of FIG. 2.

Now turning to FIG. 5, a main routine for browser 42 is illustrated at 80 in FIG. 5. Routine 80 represents an event-driven main routine for the browser. In an event-driven system, the browser waits for various events to be passed to the browser. In response to an event, the browser executes predetermined program code to handle the event. Once the event has been handled, the browser returns to a state of waiting for additional events.

It should be appreciated that routine 80 is but one suitable implementation of a browser consistent with the invention. Other implementations may use, for example, a procedural model, or in the alternative, an object-oriented model may be used, whereby individual display components and controls are represented as separate objects configured to receive different events directed to such objects. In general, the implementation of a browser or other computer program consistent with the invention may utilize any known programming model, and it will be appreciated that such an implementation would be well within the capabilities of one of ordinary skill in the art having benefit of the disclosure presented herein.

As illustrated in FIG. 5, routine 80 begins at block 82 by waiting for new events. Then, in blocks 84–100, various events are detected by the browser and control is diverted to appropriate routines to handle such events. Several events relevant to the creation and utilization of document trails consistent with the invention are detected in blocks 84–98. It should be appreciated that a wide variety of additional events may also be handled by a browser (e.g., as represented by block 100); however, such other events are not relevant to an understanding of the invention, and need not be discussed in further detail herein.

One event that may be handled by routine 80 is that of an event to create a new rail, which is detected at block 84 and handled by create new trail routine 102. Another event is to display the document at a given URL, which is detected at block 86 and handled by a display URL routine 104. Another event is that of selection of a hypertext link, which is detected at block 88 and handled by an activate link routine 106. Moreover, selection of a bookmark by a user is detected at block 90 and handled by an activate bookmark routine 108. Additional events are detected at blocks 92–98 and handled by a series of blocks 110–116. However, a discussion of these latter events will be deferred pending a discussion of the specific manners of creating and displaying a document trail.

Figure 6:
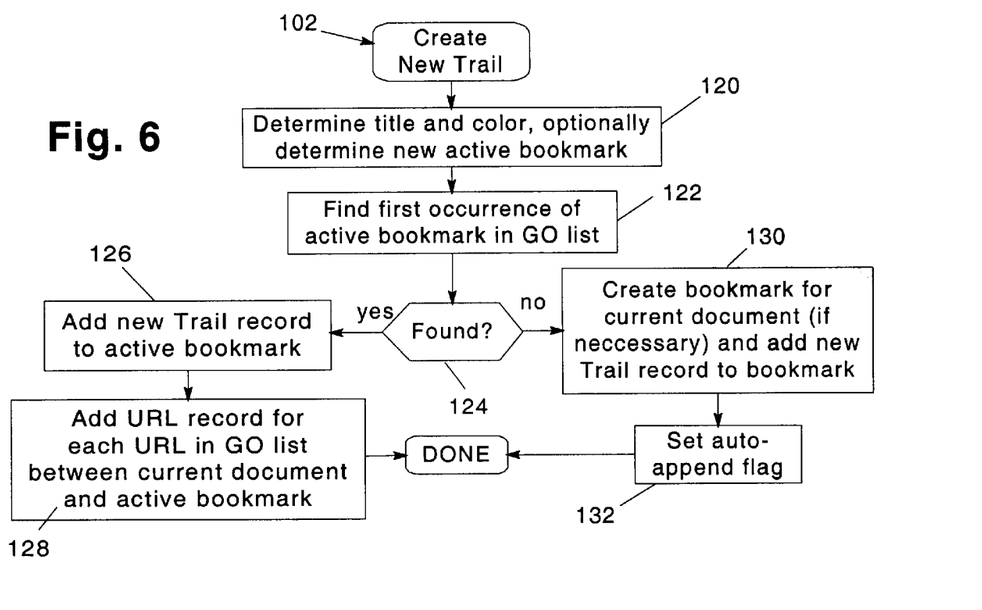
FIG. 6 is a flowchart illustrating the program flow of the create new trail routine of FIG. 5.

Create new trail routine 102 is illustrated in greater detail in FIG. 6. Routine 102 supports two alternate manners of creating a new trail. The first is an auto-backtrack function by which the GO list is interrogated to locate the active bookmark and to record as the various stops on the document trail the various documents in the GO list between the active bookmark document and the current document. An alternate manner of creating a new trail, which occurs when no occurrence of the active bookmark is located on the GO list, is an auto-append function whereby a trail is added to a bookmark associated with the current document, and additional documents are added to the trail as the user navigates subsequent to creation of the bookmark.

Routine 102 begins in block 120 by determining the title and color for the trail, as well as optionally determining a new active bookmark. The active bookmark is generally the last bookmark selected from the bookmark list by the user. It is the active bookmark that is used as the default location for which a new trail is created. Thus, a user may optionally be prompted to select another bookmark with which to associate a document trail. In the alternative, the routine may preliminarily search the GO list to locate a document that is bookmarked in the user's bookmark list.

The determination of the title and color for a trail (as well as optionally the new active bookmark) may be handled, for example, through a dialog box or other suitable user interface control. Moreover, rather than prompting the user to input suitable values, the system may alternatively automatically generate such values. For example, the color may be selected from the list of available colors, and may not be user selectable. In addition, it should be appreciated that other descriptive information pertaining to a document trail may also be included. For example, a user may be prompted to select an icon, a sound file, or other identifier for use in uniquely identifying a document trail.

Next, in block 122, the GO list is interrogated to locate the first occurrence of the active bookmark. Alternatively, block 122 may simply attempt to locate any document that is bookmarked in the bookmark list. Then, in block 124, based upon whether or not an occurrence of the active bookmark is found in the GO list, control passes to either blocks 126 and 128, or blocks 130 and 132.

If an occurrence of the active bookmark is found in the GO list, block 124 passes control to block 126 to automatically create the new document trail based upon the documents in the GO list using an auto-backtrack function. Block 126 adds a new trail record to the list of trail records for the active bookmark. At this time, the title and color supplied by the user are also added to the new trail record. Next, in block 128, a URL record is added for each URL in the GO list that is between the current document and the active bookmark. A URL record for the current document is also added to this list, representing the destination document for the document trail.

Moreover, as discussed above, optionally a URL record for the active bookmark document may also be added in some implementations. In addition, at this time it may be desirable to permit a user to input title information for each URL record, or the system may simply retrieve a title (e.g., from the title tag for each document). Alternatively, title information may be omitted from each URL record. Creation of a new trail is then complete.

Returning to block 124, if no occurrence of the active bookmark is found in the GO list, control is passed to block 130 to create a new document trail using an auto-append function. It is assumed for this function that the user is currently viewing a document that the user wishes to designate as the origination document for a new document trail. Therefore, given that this implementation ties document trails to bookmarks, routine 102 requires that a bookmark be created for the current document being viewed if no such bookmark already exists. In other implementations, e.g., where document trails are not associated with bookmarks, it may not be necessary to create a new bookmark to establish the origination document for a new document trail.

Block 130 begins by creating a bookmark for the current document, if necessary. In addition, in block 130, a new trail record is added to the current bookmark, with the title and color input by the user stored in the record. Next, in block 132, an auto-append flag is set to indicate that future navigation by the user should be recorded and stored in the trail record for the bookmark. Upon completion of block 132, routine 102 is complete.

It should be appreciated that the auto-backtrack and auto-append functions may be implemented through separate user input mechanisms, rather than being selectively invoked based upon the status of the GO list. Also, additional manners of creating a new trail (e.g., through manual creation and input of a chain of URL's, among others), may also be supported in the alternative.

Figure 10:
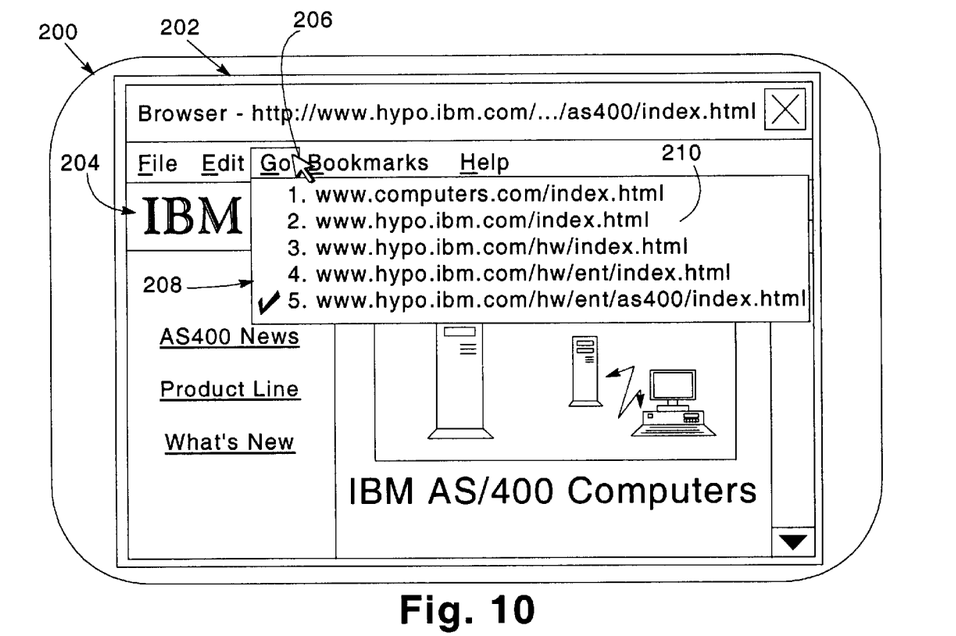
FIG. 10 is a block diagram of a computer display, illustrating a display representation of an exemplary GO list prior to creation of a new document trail by the browser of FIG. 2.

To further illustrate the operation of the document trail creation routine described herein, FIG. 10 illustrates a computer display 200 within which is displayed a window 202 for browser 41. The browser is illustrated as displaying a display representation of at least a portion of a hypertext document 204. It should be appreciated that depending upon factors such as window size, display resolution and document size, window 202 may display a display representation of either the entirety of hypertext document 204, or may display a display representation of only a portion of the document. If only a portion is represented, a user is permitted to scroll to other portions using a scroll bar in a manner well known in the art.

A pointer 206 is illustrated in FIG. 10 as selecting a GO list pull-down menu within which is displayed a GO list 210 comprising five documents, with the current and most recent document displayed at the bottom of the list. It is assumed for the purpose of this example that the second document in the GO list, having a URL of "www.hypo.ibm.com/index.html", represents the home page of a hypothetical Internet site. It is also assumed that the home page is bookmarked, with an appropriate bookmark record stored in the bookmark data structure for browser 41, and having a bookmark title of "IBM Home". Furthermore, it is assumed that the user navigated to this bookmarked document via selecting the bookmark for the document from the bookmark list, whereby the bookmark has been set as the active bookmark for the browser.

With the browser in the configuration illustrated in FIG. 10, a user may create a new document trail by invoking the appropriate event (e.g., through selection of a toolbar button or drop-down menu (not shown), or in other manners known in the art. Invocation of the event results in execution of routine 102, and after the user is prompted to enter a title and color for the new trail in block 120 (e.g., "AS/400 Home" and "blue"), block 122 searches back through the GO list (starting at document 5), and attempts to locate a document stored at the location associated with the active bookmark (here, document 2). Upon finding this occurrence, block 124 will therefore pass control to block 126 to create a new trail record with a title of "AS/400 Home" and a color of "blue". Next, block 128 adds in sequence a URL record for each document between the bookmarked document and the current document (including a record for the current document). Thus, the document trail will have URL records added to it for the documents in the GO list that are located at "www.hypo.ibm.com/hw/index.html", "www.hypo.ibm.com/hw/ent/index.html", and "www.hypo.ibm.com/hw/ent/as400/index.html". In addition, if supported, titles for each URL record may either be automatically created or requested from the user. As a result, a document trail such as identified in Table I below may be created:

TABLE I

Example Trail for www.hypo.ibm.com

| Trail | | Trail Documents | |
|---|---|---|---|
| Title | Color | Document Title | URL |
| AS/400 Home | Blue | IBM Computers | www.hypo.ibm.com/hw/index.html |
| | | Enterprise | www.hypo.ibm.com/hw/ent/index.html |
| | | AS/400 Home | www.hypo.ibm.com/hw/ent/as400/index.html |

To create a document trail using the auto-append function described above, the user would generally invoked the create new trail event while viewing the bookmarked document "www.hypo.ibm.com/index.html". Subsequently, the user would then navigate to the three succeeding documents in sequence, and then turn off the auto-append function upon navigating to the document displayed in FIG. 10.

Figure 7:
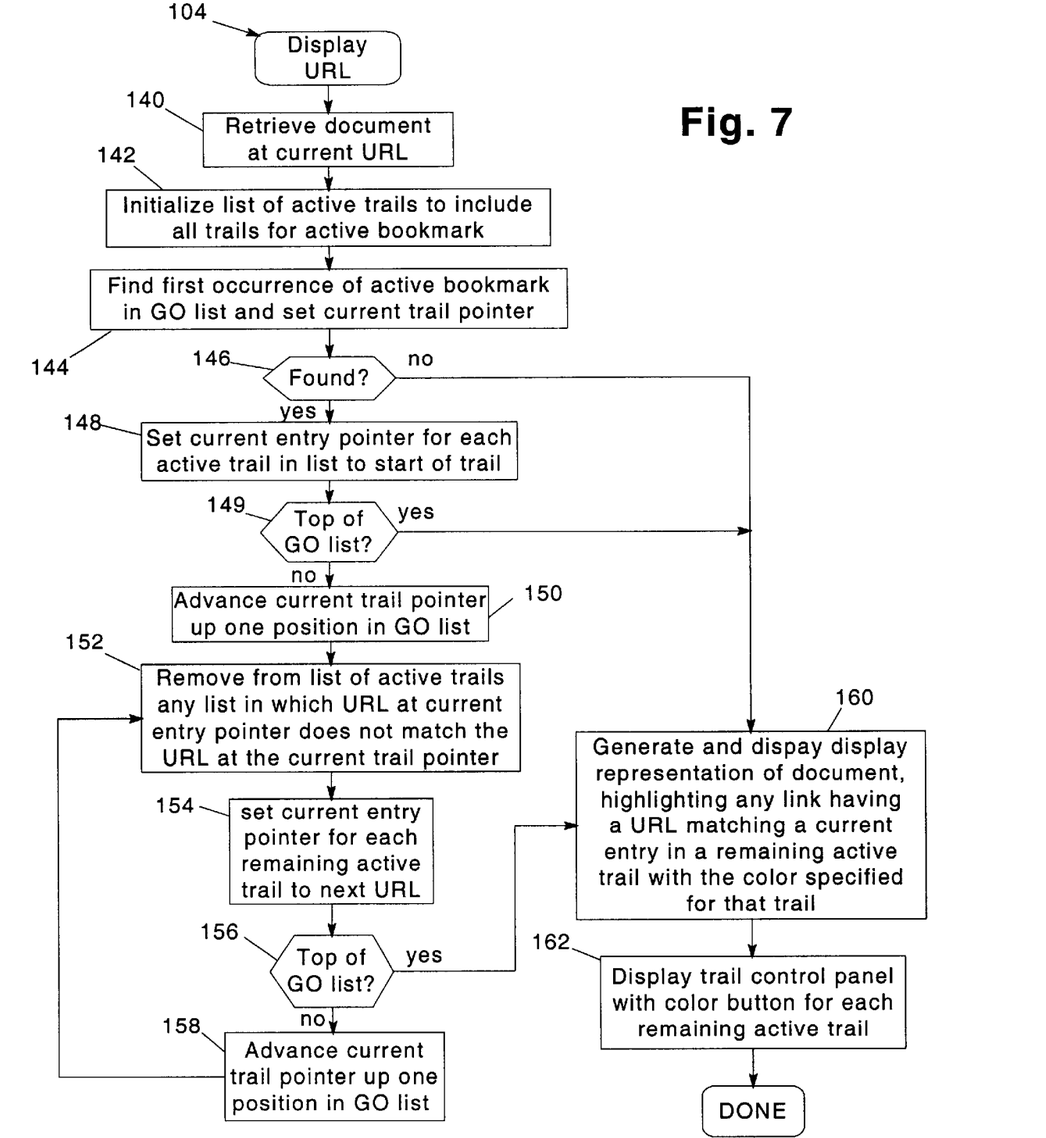
FIG. 7 is a flowchart illustrating the program flow of the display URL routine of FIG. 5.

Returning to FIG. 5, one manner of displaying a document trail to a user is handled by display URL routine 104, which is illustrated in greater detail in FIG. 7. Routine 104 is called whenever it is desirable to retrieve and display a document stored at a given storage location. A display URL event may be generated, for example, in response to a "refresh" request from a user, or whenever a bookmark or hypertext link is selected by the user (among other instances).

Routine 104 begins at block 140 by retrieving the document stored at the current URL supplied to routine 104. Next, in block 142, a list of active trails is initialized to include all trails stored for the active bookmark. Next, in block 144, the first occurrence of the active bookmark is located in the GO list, and a current trail pointer is set to point to this occurrence.

Next, it is determined in block 146 whether an occurrence of the active bookmark was found in the GO list. If so, control passes to block 148 to set a current entry pointer for each active trail list to the first URL record in the list. Next, block 149 determines whether the current trail pointer points to the top of the list—that is, whether the active bookmarked document is currently displayed.

If not, control passes to block 150 to trace forward from the active bookmarked document to the current document to determine whether the user is still following one or more trails established for the active bookmark. Specifically, in block 150, the current trail pointer is advanced forward one position in the GO list to point the current trail pointer to the document that was navigated to immediately subsequent to the document corresponding to the active bookmark. For example, for the URL list of FIG. 4, advancing the current trail pointer results in moving the pointer up one slot toward the top of the list. It should be appreciated that blocks 149 and 150 are not required for implementations that store a URL record for the bookmarked document itself at the head of the URL list for each document trail associated with that document.

Next, in block 152, a loop is initiated to advance through the GO list and determine whether the user is still on any document trail for the active bookmark. Specifically, in block 152, the URL specified at the position in the GO list pointed to by the current trail pointer is compared to the URL stored in the URL record pointed to by the current entry pointer for each active list for the active bookmark. Any list in which the URL specified by its current entry pointer does not match that specified by the current trail pointer for the GO list is removed.

Next, block 154 sets the current entry pointer for each remaining active trail to the next URL record in each active list. Control then passes to block 156 to determine whether the top of the GO list has been processed—that is, whether the current trail pointer points to the current document displayed in the browser window. So long as the top of the list has not been reached, control passes to block 158 to advance the current trail pointer up one position in the GO list. Control then returns to block 152 to re-analyze each list to determine whether or not the URL specified in each remaining list corresponds to the URL specified by the current position in the GO list.

Returning to block 156, once the top of the GO list has been processed, the only trails remaining in the list of active trails should be the trails that the user is still on. Thus, block 156 passes control to block 160 to generate and display a display representation of at least a portion of the current hypertext document, highlighting any link having a URL matching a current entry in a remaining active trail with the color specified for that trail. This results in each hypertext link that leads down a currently-active trail being displayed with a unique display representation relative to other links that are not associated with the given active trail. As such, a user can readily determine which link corresponds to a given trail that he or she is navigating along.

It should be appreciated that generating and displaying a display representation of a hypertext document is well known in the art. Moreover, generating and displaying a display representation of a hypertext link definition in a predetermined color or in conjunction with a icon or other visual representation based upon its association with an active document trail are well within the abilities of one of ordinary skill in the art.

Next, upon completion of block 160, control passes to block 162 to display a trail control panel having a color button for each remaining active trail in the list. The control panel may be implemented, for example, as a separate window or box that overlays the browser window and provides navigational buttons that a user may select to proceed to a next document along a trail without having to find the specific link that leads down the trail. A vast number of display representations may be utilized in different implementations. For example, a sequence of color buttons having colors that match the active trails may be provided for selection by a user, whereby a user may select the next document along a trail by clicking on one of the color buttons. Additional user input controls may also be provided, e.g., to backup on a trail and select the previous document specified thereby. Also, a user may be able to interface with a control to obtain additional descriptive information about a particular trail. Other modifications will be apparent to one of ordinary skill in the art.

Upon completion of block 162, routine 104 is complete.

Returning to block 149, if the active bookmarked document is currently displayed in the browser, it is not necessary to trace through the GO list and active document trails since all trails for the active bookmarked document are presumably active, since the document is the anchor for all trails associated with the active bookmark. Thus, control may be passed directly to block 160 to generate and display a display representation of the current hypertext document, highlighting any links associated with a document trail for the active bookmark.

Also, returning to block 146, if no occurrence of an active bookmark is found in the GO list, it should be appreciated that block 146 may pass control directly to block 160 to generate and display the display representation of the hypertext document. No determination of any active trails is required in this instance since no active bookmark has been recently navigated to.

To better illustrate the operation of the display URL routine described herein, Table II below continues the example discussed above with respect to FIG. 10 and Table I by including several example trails for the bookmarked document at "www.hypo.ibm.com", including the trail entitled "AS/400 Home" created above:

TABLE II

Example Trails for www.hypo.ibm.com

| Trail | | Trail Documents | |
|---|---|---|---|
| Title | Color | Document Title | URL |
| AS/400 Home | Blue | IBM Computers | www.hypo.ibm.com/hw/index.html |
| | | Enterprise Home | www.hypo.ibm.com/hw/ent/index.html |
| | | AS/400 Home | www.hypo.ibm.com/hw/ent/as400/index.html |
| PC Home | Green | IBM Computers | www.hypo.ibm.com/hw/index.html |
| | | PC Home | www.hypo.ibm.com/hw/pc/index.html |

TABLE II-continued

Example Trails for www.hypo.ibm.com

| Trail | | Trail Documents | |
|---|---|---|---|
| Title | Color | Document Title | URL |
| New Java Products | Red | IBM Software | www.hypo.ibm.com/sw/index.html |
| | | Programming | www.hypo.ibm.com/sw/ide/index.html |
| | | Java Home | www.hypo.ibm.com/sw/ide/java/index.html |
| | | Java What's New | www.hypo.ibm.com/sw/ide/java/new.html |

Figure 11:
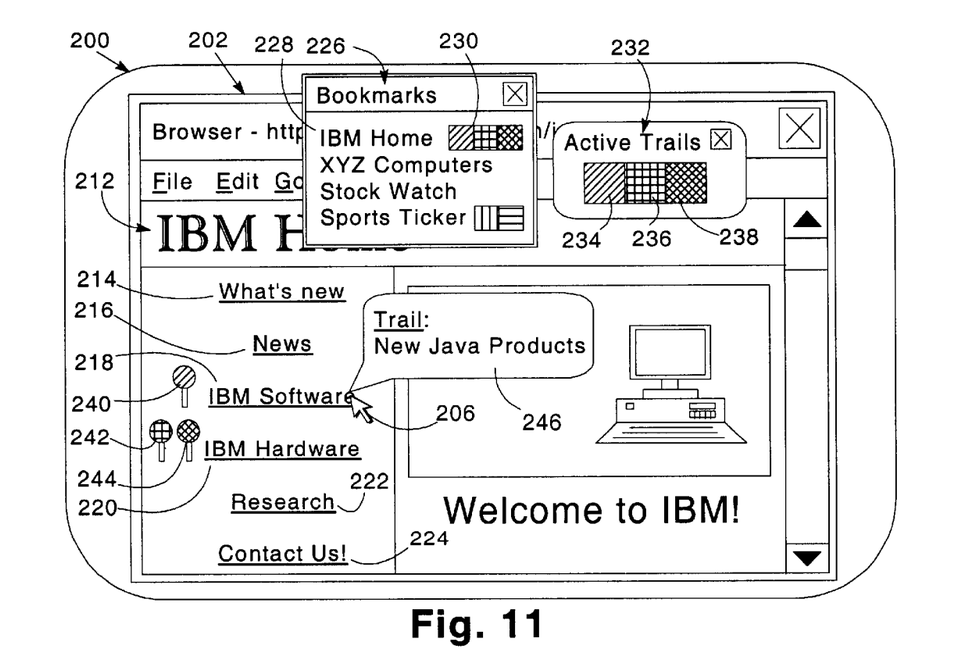
FIGS. 11 and 12 are additional block diagrams of the computer display of FIG. 10, illustrating the display of various document trail identifiers consistent with the invention.

FIG. 11 illustrates an exemplary display representation of the active bookmarked document at "www.hypo.ibm.com/index.html", designated as document 212. Several display representations are illustrated for hypertext link definitions 214, 216, 218, 220, 222 and 224. In addition, a bookmark window 226 is illustrated showing a user's list of bookmarks 228. For each such bookmark, the trails associated therewith may be represented graphically using a series of color buttons 230 displayed in the colors associated with each trail. Three such buttons are illustrated to coordinate respectively with the three trails defined for hypertext document 212 as discussed above with reference to Table II. Through a user's selection of any of any of these buttons, a user may navigate the browser to the bookmarked document, with the document positioned proximate the hypertext link pointing to the next stop on the trail. In addition, through other user input actions, such as right-clicking on any color button or merely placing the pointer over a particular color button, additional information about the trail, including its title, and possibly a list of the documents in the trail, may also be displayed to the user. Implementation of such user input mechanisms will be apparent to one of ordinary skill in the art.

Also displayed in FIG. 11 is a trail control panel 232 in which is illustrated three color button controls 234, 236 and 238 corresponding respectively to the "New Java Products", "AS/400 Home" and "New Papers" trails defined in Table II. Through selection of any of these color buttons, the next document specified in those trails is navigated to. It should be appreciated that additional information about a trail may be displayed in response to a user placing the pointer over any of these color buttons. Moreover, additional controls, such as "BACK" controls to return to a previous document along a trail, may also be used as well.

To uniquely represent any link corresponding to an active trail, a unique display representation is provided therefor which distinguishes the link from other links pointing to documents not on any active trail. It should be appreciated that for hypertext document 212, routine 104 of FIG. 7 would follow the sequence of blocks 140, 142, 144, 146, 148, 149, 160 and 162, since the active bookmarked document is at the top of the GO list and currently displayed. Thus, all document trails associated with the bookmarked document would remain in the list of active trails, and hypertext links 218 and 220 (FIG. 11), which point to the next documents in the three document trails identified in Table II, will be highlighted.

Consequently, as shown in FIG. 11, for the display representation of hypertext link 218, a colored icon 240 may be provided to indicate that the link will navigate to the next document on the "New Java Products" trail corresponding to the link. Similarly, icons 242 and 244 may also be provided for hypertext link 220 to illustrate that two separate trails may be reached via selection of the display representation of link 220.

The icons may, for example, be configured to represent signs to provide a readily discernible indication of the presence of a document trail. Other icons may be used, and moreover, links may merely be represented in the colors associated with different trails without the use of icons. Other multimedia representations described above may also be used.

Figure 12:
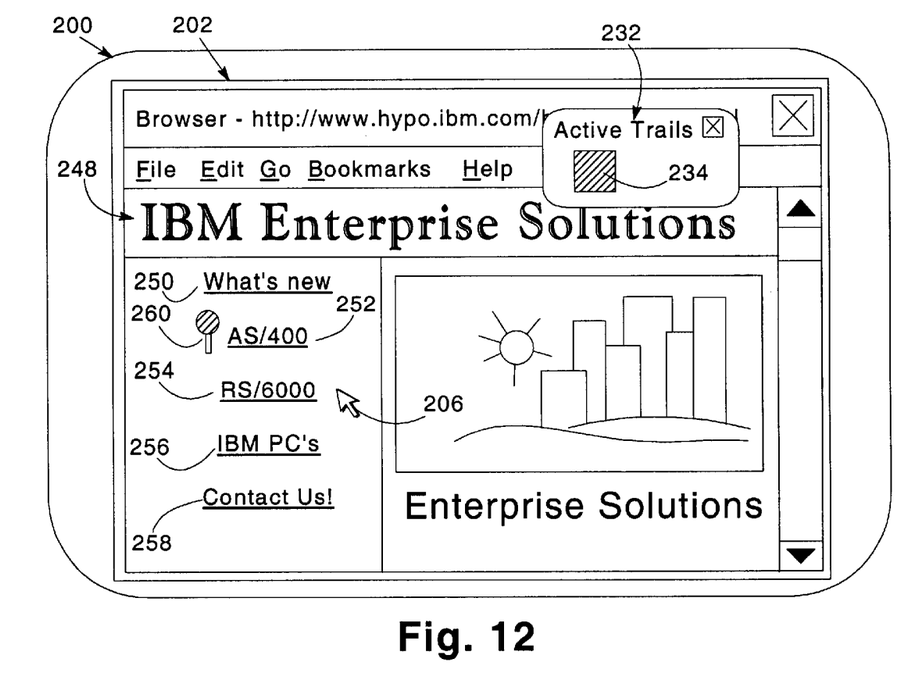

To further illustrate the operation of routine 104, FIG. 12 illustrates a display representation of a hypertext document 248 in browser window 202 shown in display 200. Document 248 has a URL of "www.hypo.ibm.com/hw/ent/index.html", and it is assumed that this document was reached from the active bookmarked document of FIG. 11 by selecting the "IBM Hardware" and "Enterprise Home" hypertext links forming the first two stops along the "AS/400 Home" document trail of Tables I and II. A series of hypertext links 250, 252, 254, 256 and 258 are illustrated, with link 252 referencing the next stop on the "AS/400 Home" document trail (specifically the document at "www.hypo.ibm.com/hw/ent/as400/index.html"). Also, link 256 references a stop along the "PC Home" document trail (specifically the document at "www.hypo.ibm.com/hw/pc/index.html").

It should be appreciated that routine 104 of FIG. 7 would follow a program flow from block 140 to block 152 to locate the active bookmarked document in the GO list, initialize the pointers, and kick off a loop that traces forward from the active bookmarked document. Initially, all three document trails identified in Table II would be included in the list of active trails. After the first pass through the loop of blocks 152–158, however, the "New Java Products" trail would be removed from the list, as the first URL record for that list ("www.hypo.ibm.com/sw/index.html") does not match the next document in the GO list ("www.hypo.ibm.com/hw/index.html"). The other two trails, which match this document, would not be removed. Upon the next pass through the loop, the "PC Home" trail would be removed, as the second URL record for that list ("www.hypo.ibm.com/hw/pc/index.html") does not match the next document in the GO list ("www.hypo.ibm.com/hw/ent/index.html", the currently-displayed document). Thus, control would be passed to blocks 160 and 162 with only the "AS/400 Home" trail remaining in the list of active trails, and routine 104 would be complete.

Consequently, as a result of the operation of routine 104, only link 252 is highlighted, represented by icon 260. Moreover, trail control panel 232 only provides a color button 234 for the "AS/400 Home" trail. Link 256, which represents a stop on a non-active document trail, is not highlighted in this circumstance, nor is a color button provided on control panel 232.

Figure 8:
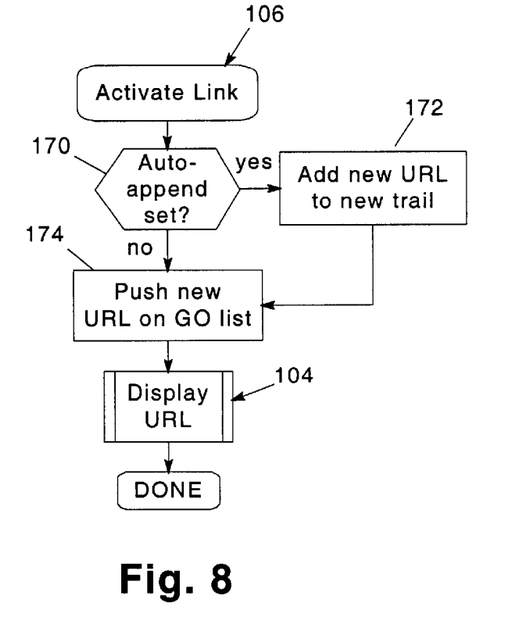
FIG. 8 is a flowchart illustrating the program flow of the activate link routine of FIG. 5.

FIG. 8 next illustrates activate link routine 106 in greater detail. Activate link routine 106 is initiated in response to an activate link event which is typically generated in response to a user pointing and clicking on a display representation of a hypertext link definition displayed in a current hypertext document for the browser. Routine 106 begins in block 170 by determining whether the auto-append flag has been set, indicating that the browser is currently in an auto-append mode whereby any subsequent navigations result in additional URL records being added to the current document trail. If the flag is set, control passes to block 172 to add a new URL record corresponding to the selected URL to the new document trail. Control then passes to block 174 to push the new URL onto the GO list, indicating that the user has navigated to the new document. Returning to block 170, if the auto-append flag is not set, control passes directly to block 174.

Upon completion of block 174, display URL routine 104 is called to display the new URL in the browser window. Routine 106 is then complete.

In other embodiments, it may be desirable to enable the auto-append function to remove documents from an active document trail as a user backtracks from a given document, rather than simply adding previously viewed documents to the end of the trail. Thus, for example, if a user were to navigate to document A, then to document B, then back to document A, and next to document C, the resulting document trail would include documents A and C, rather than documents A, B, A, C as would occur with routine 106.

Figure 9:
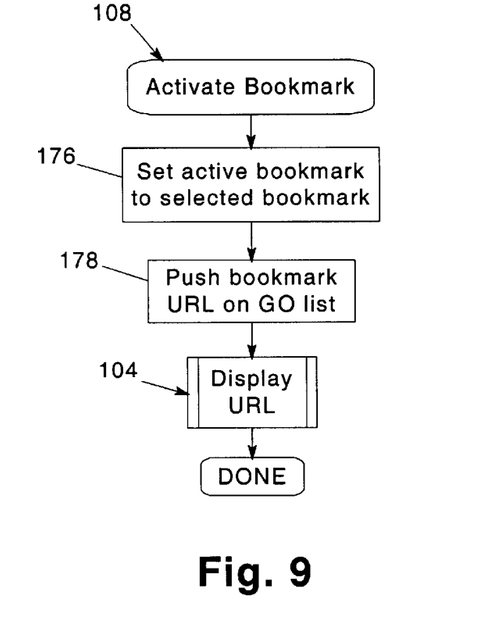
FIG. 9 is a flowchart illustrating the program flow of the activate bookmark routine of FIG. 5.

Activate bookmark routine 108 is illustrated in greater detail in FIG. 9. Routine 108 is called in response to an activate bookmark event, which is typically generated in response to a user selecting a bookmark from a pull-down menu or separate window displaying a list of bookmarks available to the user (e.g., bookmark window 226 of FIG. 11). Routine 108 begins in block 176 by setting the active bookmark to point to the bookmark selected by the user. Next, in block 178, the URL for the bookmark is pushed onto the GO list. Next, routine 104 is called to display the new URL corresponding to the bookmark. Routine 108 is then complete.

Returning again to FIG. 5, several additional relevant events handled by the browser are described in greater detail. One such event is that of a link for an active trail being in focus. This event is detected at block 92, and handled in block 110 by displaying information about the active trail in a pop-up window anchored proximate the link. This event is typically generated in response to a user positioning a mouse pointer over the display representation of a hypertext link definition that specifies as its URL a document located in an active document trail. Consequently, a user is able to quickly and easily obtain information about a particular trail merely by positioning the mouse pointer over the link corresponding thereto. It should be appreciated that a similar informational function may also be supported for the trail control panel that overlays the browser window, as well as for the color buttons displayed in a bookmark menu or window.

A representative display of supplemental informational function is illustrated in FIG. 11. Specifically, pop-up window 246 is shown as displaying additional information about the "New Java Products" trail in response to a user positioning pointer 206 over the display representation for hypertext link 218. It should be appreciated that various information may be presented to a user, e.g., trail title, trail color, and/or a list of stops along the document trail.

Returning to FIG. 5, another event that may be handled by the browser is that of removing a trail from the list of trails for a given bookmark. This event is detected in block 94 and handled in block 112 by removing the trail record corresponding to the trail from the bookmark data structure. Removing a record from a linked list is generally understood in the art, and thus need not be described in greater detail herein. It should be appreciated that other editing functions, such as clearing a portion of a document trail, editing specific stops along the trail, etc., may also be provided as desired. Typically, such events may be generated in response to user input directed, for example, to various pull-down menus, toolbar buttons, or the like.

Yet another event that may be handled by the browser is that of selection of a particular color button on the trail control panel for the browser, which is detected at block 96. Initiation of this event is typically performed in response to user selection of a color button on the control panel. In response, block 96 passes control to block 114 to push the next URL in the trail corresponding to the selected color onto the GO list. Next, display URL routine 104 is called to navigate to the next document along the given trail.

Another event that may be handled by the browser is an auto-append off event, which is detected at block 98 and handled at block 116 by clearing the auto-append flag. This event is typically generated in response to a user reaching the end of a document trail that he or she has decided to create. Once a user reaches the destination document for the generated trail, he or she may clear the auto-append flag to cease adding records to the new document trail. This may be performed, for example, through a keystroke combination, toolbar button, pull-down menu, or in other manners known in the art.

It should be appreciated that other events may be utilized to manipulate the document trails described herein.

Various modifications may be made to the illustrated embodiments without departing from the spirit and scope of the invention. For example, document trails need not be associated with particular bookmarks. Rather, a separate data structure may be maintained for various document trails, with document trails merely specifying origination, destination, and intermediate hypertext documents. In such instances, each time a document is displayed, it may be necessary to scan through the list of document trails to determine if any hypertext link in the document specifies a document in one of the trails. Also, it may be desirable to create a list of active trails as with routine 104 to detect trails that have been followed since the viewing of one or more origination documents that anchor such trails.

As another example, it may be desirable to permit users to share document trails with one another by storing and transmitting persistent representations of document trail information between the users. It should be appreciated that importing and exporting functions may be supported to facilitate the exchange of document trails between multiple users.

Furthermore, it may also be desirable to permit an author of a document to supply one or more document trails to viewers of the document. This function may be supported by permitting a user to download a document trail data structure, or in the alternative, the information may be embedded in the document, e.g., via a dedicated HTML tag.

In addition, other manners of creating new trails may be utilized, e.g., a purely manual manner whereby different documents are manually added to a trail. In such instances, the documents may not even have hypertext links therebetween. Rather, the document trail would provide merely a sequence of documents that a use wishes to navigate to in order.

Moreover, it may be desirable to perform additional functions whenever a user selects a given document trail. For example, as illustrated by activate bookmark routine 108' of FIG. 13, it may be desirable to prefetch the hypertext documents along a given document trail in response to a user activating a given bookmark having associated therewith one or more document trails. Through prefetching, a document is typically retrieved from its remote location (e.g., the Internet or another network server), and is loaded into a local cache for the user. Consequently, whenever a user attempts to navigate down a particular trail, the documents therefor are likely available locally in the user's computer to speed the user's access to those documents.

Figure 13:
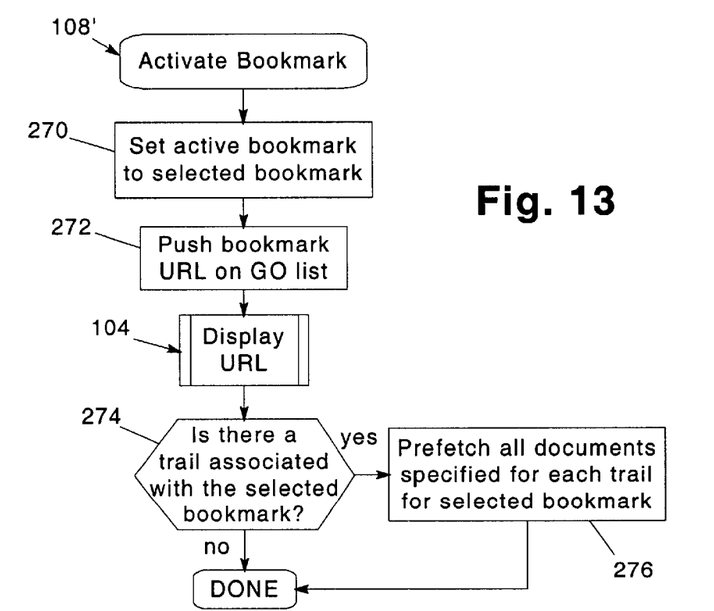
FIG. 13 is a flowchart illustrating an alternate active bookmark routine to that of FIG. 9.

Specifically, as shown in FIG. 13, after setting the active bookmark and pushing the bookmark on the GO list in blocks 270 and 272 (which operate in the same manner as blocks 176 and 178 of routine 108) and calling display URL routine 104, it may be desirable to execute block 274 to determine whether the selected bookmark has any document trail associated therewith. If not, routine 108' terminates. If so, however, control is first passed to block 276 to prefetch all documents for any given document trail associated with the bookmark. Typically, the prefetch would be performed in a separate execution thread so that the prefetch operation occurs in the background to minimize the perceived impact on system performance.

In other implementations, it may be desirable to defer prefetching until a user has started down a particular trail, rather than prefetching all trails for a given bookmarked document. For example, it may be desirable to only prefetch whenever a user is viewing a bookmarked document and the user selects the next stop on a given document trail. Other alternative prefetch logic may also be used in the alternative.

Other modifications may be made to the embodiments described herein without departing from the spirit and scope of the invention. Therefore, the invention lies in the claims hereinafter appended.

What is claimed is:

1. A method of displaying a hypertext document, the method comprising:
   (a) displaying a display representation of at least a portion of a first hypertext document on a computer display, the portion of the first hypertext document including a hypertext link definition that references a second hypertext document;
   (b) determining whether the second hypertext document is one of a plurality of interlinked hypertext documents in a document trail, wherein the plurality of interlinked hypertext documents is arranged in a predetermined sequence and includes a selected origination hypertext document and a selected destination hypertext document, wherein the document trail is a selected one of a plurality of document trails, with each document trail associated with one of a plurality of origination hypertext documents, and wherein determining whether the second hypertext document is in the document trail includes:
      (i) searching a history list for the selected origination hypertext document, the history list including a plurality of previously-viewed hypertext documents arranged in the order in which the previously-viewed hypertext documents were viewed;
      (ii) comparing each of the previously-viewed hypertext documents viewed since the selected origination hypertext document with a corresponding interlinked hypertext document in the document trail;
      (iii) initially storing in a list of active document trails each document trail associated with the selected origination hypertext document, wherein comparing the previously-viewed hypertext document includes comparing each of the previously-viewed hypertext documents viewed since the selected origination hypertext document with a corresponding interlinked hypertext document for each document trail in the list of active document trails;
      (iv) removing from the list of active document trails any document trail in which at least one of the previously-viewed hypertext documents viewed since the selected origination hypertext document does not match the corresponding interlinked hypertext document for that document trail; and
      (v) determining that the second hypertext document is one of the plurality of interlinked hypertext documents in the selected document trail if the selected document trail remains in the list of active document trails and the second hypertext document follows the first hypertext document in the selected document trail; and
   (c) displaying one of first and second display representations of the hypertext link definition within the display representation of the portion of the first hypertext document based upon whether the second hypertext document is one of the plurality of interlinked hypertext documents in the document trail, wherein the first display representation indicates that the second hypertext document is one of the plurality of interlinked hypertext documents in the document trail, and wherein the second display representation indicates that the second hypertext document is not one of the plurality of interlinked hypertext documents in the document trail.

2. The method of claim 1, wherein the selected origination hypertext document is associated with a bookmark.

3. The method of claim 2, wherein the bookmark is one of a plurality of bookmarks, and wherein each document trail is associated with one of the plurality of bookmarks, the method further comprising:
   (a) displaying a display representation of at least a portion of the plurality of bookmarks; and
   (b) displaying in association with the display representation of any bookmark a display representation of any document trail associated therewith.

4. The method of claim 3, wherein displaying the display representation of a document trail includes displaying a user interface control adjacent the display representation of the bookmark associated therewith, the method further comprising navigating to the origination document of a document trail in response to user input directed to the user interface control associated therewith.

5. The method of claim 4, wherein a selected document trail is associated with a color, and wherein the user interface control therefor has a color that matches that of the selected document trail.

6. The method of claim 1, wherein each document trail is associated with one of a plurality of bookmarks, with each bookmark associated with the origination hypertext document for the associated document trail, and wherein searching the history list includes searching the history list for an active bookmark among the plurality of bookmarks, the active bookmark representative of a last bookmark selected in response to user input.

7. The method of claim 1, further comprising:
   (a) displaying a trail control panel on the computer display, the trail control panel including a user interface control for each active document trail in the list of active document trails; and
   (b) in response to user input directed to a selected user interface control in the trail control panel, displaying a display representation of at least a portion of a next hypertext document in the active document trail associated with the selected user interface control.

8. The method of claim 1, further comprising displaying a display representation of at least a portion of the second hypertext document on the computer display in response to user input directed to the one of the first and second display representations of the hypertext link definition.

9. The method of claim 1, wherein the first and second hypertext documents are formatted in Hypertext Markup Language (HTML), and wherein the document trail includes an identifier for each of the plurality of interlinked hypertext documents, with the identifier for each interlinked hypertext document including a Uniform Resource Locator (URL).

10. The method of claim 1, wherein the first and second display representations of the hypertext link definition are distinguished based upon color.

11. The method of claim 1, wherein the first display representation includes an icon.

12. The method of claim 1, further comprising displaying information about the document trail in response to user input directed to the one of the first and second display representations of the hypertext link definition.

13. The method of claim 1, further comprising, in response to user input to display a display representation of at least a portion of a selected interlinked hypertext document in the document trail, prefetching each interlinked hypertext document in the document trail subsequent to the selected interlinked hypertext document.

14. The method of claim 13, wherein prefetching each interlinked hypertext document in the document trail is performed only in response to user input to display the selected origination hypertext document.

15. The method of claim 13, wherein the plurality of interlinked hypertext documents further includes an immediately subsequent hypertext document to the selected origination hypertext document, and wherein prefetching each interlinked hypertext document in the document trail is performed only in response to user input to display the immediately subsequent hypertext document while the selected origination hypertext document is displayed.

16. An apparatus, comprising:
(a) a memory;
(b) a document trail resident in the memory, the document trail identifying a plurality of interlinked hypertext documents; and
(c) a program resident in the memory, the program configured to display a display representation of at least a portion of a first hypertext document to a user, the display representation of the first hypertext document including a display representation of a hypertext link definition that references a second hypertext document, with the display representation of the hypertext link definition selected from first and second display representations to indicate whether the second hypertext document is identified in the document trail;
wherein the plurality of interlinked hypertext documents is arranged in a predetermined sequence and includes a selected origination hypertext document and a selected destination hypertext document, wherein the document trail is a selected one of a plurality of document trails, with each document trail associated with one of a plurality of origination hypertext documents, and wherein the program is further configured to determine whether the second hypertext document is in the document trail by: (i) searching a history list for the selected origination hypertext document, the history list including a plurality of previously-viewed hypertext documents arranged in the order in which the previously-viewed hypertext documents were viewed; (ii) comparing each of the previously-viewed hypertext documents viewed since the selected origination hypertext document with a corresponding interlinked hypertext document in the document trail; (iii) initially storing in a list of active document trails each document trail associated with the selected origination hypertext document, wherein comparing the previously-viewed hypertext document includes comparing each of the previously-viewed hypertext documents viewed since the selected origination hypertext document with a corresponding interlinked hypertext document for each document trail in the list of active document trails; (iv) removing from the list of active document trails any document trail in which at least one of the previously-viewed hypertext documents viewed since the selected origination hypertext document does not match the corresponding interlinked hypertext document for that document trail; and (v) determining that the second hypertext document is one of the plurality of interlinked hypertext documents in the selected document trail if the selected document trail remains in the list of active document trails and the second hypertext document follows the first hypertext document in the selected document trail.

17. The apparatus of claim 16, wherein the selected origination hypertext document is associated with a bookmark among a plurality of bookmarks, wherein each document trail is associated with one of the plurality of bookmarks, and wherein the program is further configured to display a display representation of at least a portion of the plurality of bookmarks, and to display in association with the display representation of any bookmark a display representation of any document trail associated therewith.

18. The apparatus of claim 16, wherein the document trail is associated with a bookmark among a plurality of bookmarks, wherein the program is configured to search the history list by searching for an active bookmark among the plurality of bookmarks, and wherein the program is further configured to set the selected bookmark to the active bookmark in response to user input to select the selected bookmark.

19. The apparatus of claim 16, wherein the first and second hypertext documents are formatted in Hypertext Markup Language (HTML), and wherein the document trail includes an identifier for each of the plurality of interlinked hypertext documents, with the identifier for each interlinked hypertext document including a Uniform Resource Locator (URL).

20. The apparatus of claim 16, wherein the program is configured to indicate that the second hypertext document is identified in the document trail by including in the display representation of the hypertext link definition a predetermined color associated with the document trail.

21. The apparatus of claim 16, wherein the program is configured to indicate that the second hypertext document is identified in the document trail by including in the display representation of the hypertext link definition a predetermined icon associated with the document trail.

22. The apparatus of claim 16, wherein the program is further configured to, in response to user input to display a display representation of at least a portion of a selected interlinked hypertext document in the document trail, prefetch each interlinked hypertext document in the document trail subsequent to the selected interlinked hypertext document.

23. A program product, comprising:
(a) a program configured to display a display representation of at least a portion of a first hypertext document to a user, the display representation of the first hypertext document including a display representation of a hypertext link definition that references a second hypertext document, with the display representation of the hypertext link definition selected from first and second display representations to indicate whether the second hypertext document is identified in a document trail that identifies a plurality of interlinked hypertext documents; and
(b) a signal bearing media bearing the program;
wherein the plurality of interlinked hypertext documents is arranged in a predetermined sequence and includes a selected origination hypertext document and a selected destination hypertext document, wherein the document trail is a selected one of a plurality of document trails, with each document trail associated with one of a plurality of origination hypertext documents, and wherein the program is further configured to determine whether the second hypertext document is in the document trail by: (i) searching a history list for the selected origination hypertext document, the history list including a plurality of previously-viewed hypertext documents arranged in the order in which the previously-viewed hypertext documents were viewed; (ii) comparing each of the previously-viewed hypertext documents viewed since the selected origination hypertext document with a corresponding interlinked hypertext document in the document trail; (iii) initially storing in a list of active document trails each document trail associated with the selected origination hypertext document, wherein comparing the previously-viewed hypertext document includes comparing each of the previously-viewed hypertext documents viewed since the selected origination hypertext document with a corresponding interlinked hypertext document for each document trail in the list of active document trails; (iv) removing from the list of active document trails any document trail in which at least one of the previously-viewed hypertext documents viewed since the selected origination hypertext document does not match the corresponding interlinked hypertext document for that document trail; and (v) determining that the second hypertext document is one of the plurality of interlinked hypertext documents in the selected document trail if the selected document trail remains in the list of active document trails and the second hypertext document follows the first hypertext document in the selected document trail.

24. The program product of claim 23, wherein the signal bearing media is recordable media.

25. The program product of claim 23, wherein the signal bearing media is transmission type media.

* * * * *